US010125681B2

(12) United States Patent
Duchene et al.

(10) Patent No.: US 10,125,681 B2
(45) Date of Patent: Nov. 13, 2018

(54) TORQUE RIPPLE COMPENSATING DEVICE

(71) Applicant: Dana Limited, Maumee, OH (US)

(72) Inventors: Thibaut E. Duchene, Woluwe-Saint-Lambert (BE); Donald J. Remboski, Ann Arbor, MI (US); Mark R. J. Versteyhe, Oostkamp (BE); James F. Ziech, Kalamazoo, MI (US)

(73) Assignee: Dana Limited, Maumee, OH (US)

( * ) Notice: Subject to any disclaimer, the term of this patent is extended or adjusted under 35 U.S.C. 154(b) by 1169 days.

(21) Appl. No.: 14/197,909

(22) Filed: Mar. 5, 2014

(65) Prior Publication Data
US 2014/0261282 A1    Sep. 18, 2014

Related U.S. Application Data
(60) Provisional application No. 61/776,838, filed on Mar. 12, 2013.

(51) Int. Cl.
*F02B 75/06* (2006.01)
*F16F 15/12* (2006.01)
*F16F 15/31* (2006.01)

(52) U.S. Cl.
CPC .......... *F02B 75/06* (2013.01); *F16F 15/1204* (2013.01); *F16F 15/31* (2013.01)

(58) Field of Classification Search
CPC ........ F02B 75/06; F16F 15/31; F16F 15/1204
(Continued)

(56) References Cited

U.S. PATENT DOCUMENTS 2,027,329 A * 1/1936 Van Ranst ............. B60K 17/22
                                                    180/380
2,689,468 A    9/1954 Potgieter
(Continued)

FOREIGN PATENT DOCUMENTS

DE    2254612 A1    5/1973
DE    19542764 A1   6/1996
(Continued)

OTHER PUBLICATIONS
International Search Report—Application No. PCT/US2014/020701—dated Jun. 5, 2014.
(Continued)

*Primary Examiner* — Hung Q Nguyen
(74) *Attorney, Agent, or Firm* — Marshall & Melhorn, LLC

(57) ABSTRACT

A torque ripple compensating device for an internal combustion engine is provided. The torque ripple compensating device comprises a first member, a second member, and a third member. The first member is in driving engagement with an output of the internal combustion engine. The second member is in driving engagement with the first member. The third member is in driving engagement with the second member. An angular deviation between the first member and the third member causes a cyclical acceleration of the third member. The cyclical acceleration of the third member applies a torque to the output of the internal combustion engine through the first member. The torque ripple compensating device is able to be passively or dynamically adapted for both an amplitude and a phase of a torque ripple while minimizing an interference with an operation of the internal combustion engine.

16 Claims, 2 Drawing Sheets

(58) Field of Classification Search
USPC .................. 123/192.1, 192.2; 464/57, 60, 97
See application file for complete search history.

(56) References Cited

U.S. PATENT DOCUMENTS

| | | | |
|---|---|---|---|
| 2,819,597 | A | 1/1958 | Wildhaber |
| 2,834,226 | A | 5/1958 | Hirst |
| 3,059,453 | A | 10/1962 | Codlin |
| 3,062,023 | A * | 11/1962 | Stolworthy ............... F16D 3/72 267/273 |
| 3,347,214 | A | 10/1967 | Plagmann |
| 3,712,081 | A | 1/1973 | Philipp et al. |
| 3,887,024 | A | 6/1975 | Takahashi et al. |
| 4,138,003 | A | 2/1979 | Malloy |
| 4,300,649 | A | 11/1981 | Sakata |
| 5,083,535 | A | 1/1992 | Deschler et al. |
| 5,255,646 | A | 10/1993 | Inagaki et al. |
| 5,704,839 | A | 1/1998 | Michael et al. |
| 5,888,139 | A | 3/1999 | Hoshino |
| 6,923,305 | B2 | 8/2005 | Dulancy et al. |
| 7,195,111 | B2 | 3/2007 | Fukushima |
| 2007/0179012 | A1 | 8/2007 | Kimura et al. |
| 2012/0192673 | A1 | 8/2012 | Duerre et al. |
| 2012/0199094 | A1 | 8/2012 | Roehrig et al. |
| 2013/0104693 | A1 | 5/2013 | Bai et al. |
| 2014/0260777 | A1 | 9/2014 | Versteyhe |
| 2014/0260778 | A1 | 9/2014 | Versteyhe et al. |
| 2014/0261282 | A1 | 9/2014 | Versteyhe et al. |

FOREIGN PATENT DOCUMENTS

| | | |
|---|---|---|
| DE | 10122541 A1 | 1/2002 |
| DE | 102007025549 A1 | 12/2008 |
| GB | 12492 A | 2/1913 |
| GB | 318938 A | 9/1929 |
| GB | 477339 A | 12/1937 |
| GB | 2294994 A | 5/1996 |
| JP | S582429 A | 1/1983 |
| JP | H08156508 A | 6/1996 |
| KR | 1020090060619 A | 6/2009 |

OTHER PUBLICATIONS

Machine-generated English Translation of DE 10122541, obtained via Espacenet Patent Search.
Machine-generated English Translation of DE 102007025549, obtained via Espacenet Patent Search.
European Search Report of European Patent Application 14 159 802.9-1755, dated Jan. 2, 2018.

* cited by examiner

TORQUE RIPPLE COMPENSATING DEVICE

RELATED APPLICATION

The present application claims the benefit of U.S. Provisional Application No. 61/776,838 filed on Mar. 12, 2013, which is incorporated herein in its entirety by reference.

FIELD OF THE INVENTION

The present invention relates to internal combustion engines and more specifically to a torque ripple compensating device for use with an internal combustion engine.

BACKGROUND OF THE INVENTION

Due to recent improvements in combustion engine technology, there has been a trend to downsize internal combustion engines used in vehicles. Such improvements also result in more efficient vehicle, while maintaining similar performance characteristics and vehicle form factors favoured by consumers One common improvement used with internal combustion engines is the addition of a supercharger or a turbocharger. Typically, the addition of the supercharger or the turbocharger is used to increase a performance of an engine that has been decreased in displacement or a number of engine cylinders. Such improvements typically result in an increased torque potential of the engine, enabling the use of longer gear ratios in a transmission of the vehicle. The longer gear ratios in the transmission enable engine down-speeding. Engine down-speeding is a practice of operating the engine at lower operating speeds. Such improvements typically result in improved fuel economy, operation near their most efficient level for a greater amount of time compared to conventional engines, and reduced engine emissions.

In some designs, however, engine down-speeding can result in an undesirable increase in torque ripple at low operating speeds of the engine. For example, a significantly increased torque ripple can appear at an engine output when the engine is operating at low idle speeds. The torque ripple is a well-known engine dynamic that results from torque not being delivered constantly, but periodically during each power stroke of the operating cycle of an internal combustion engine. FIG. 1 is a graph illustrating a torque output of an engine during a four stroke cycle of an engine. In the four stroke cycle, the torque ripple happens once every two turns of a crankshaft for each cylinder of the engine. Accordingly, a four cylinder engine will have two torque ripples per crankshaft turn while a three cylinder engine will have three ripples every two crankshaft turns.

An amplitude of the torque ripple also varies with an operating speed of the engine and a load applied to the engine. A phase of the torque ripple varies with an operating speed and a load applied to the engine. Torque ripples can cause many problems for components of the vehicle near the engine, such as but not limited to: increased stress on the components, increased wear on the components, and exposure of the components to severe vibrations. These problems can damage a powertrain of the vehicle and result in poor drivability of the vehicle. In order to reduce the effects of these problems, smooth an operation of the engine, and improve an overall performance of the engine, the torque ripples may be compensated for using an engine balancing method. Many known solutions are available for multi-cylinder engine configurations to reduce or eliminate the stresses and vibration caused by the torque ripples.

Torque ripple compensator devices are known in the art; however, the known device have many shortcomings. In many conventional vehicles, the torque ripples are compensated for using at least one flywheel. FIG. 2 illustrates a conventional flywheel based damping system. In other applications, a dual-mass flywheel system may be used. An inertia of the flywheel dampens a rotational movement of the crankshaft, which facilitates operation of the engine running at a substantially constant speed. Flywheels may also be used in combination with other dampers and absorbers.

A weight of the flywheel, however, can become a factor in such torque ripple compensating devices. A lighter flywheel accelerates faster but also loses speed quicker, while a heavier flywheel retain speeds better compared to the lighter flywheel, but the heavier flywheel is more difficult to slow down. However, a heavier flywheel provides a smoother power delivery, but makes an associated engine less responsive, and an ability to precisely control an operating speed of the engine is reduced.

In addition to a weight of the flywheel, another problem with conventional inertia and damping systems is a lack of adaptability. The conventional inertia and damping systems are designed for the worst operational condition and must be large enough to dampen vibrations at lower operating speeds. As a result, the conventional inertia and damping systems are not optimized for higher operating speeds, resulting in inadequate performance.

It would be advantageous to develop a torque ripple compensating device able to be passively or dynamically adapted for both an amplitude and a phase of a torque ripple while minimizing an interference with an operation of an internal combustion engine.

SUMMARY OF THE INVENTION

Presently provided by the invention, a torque ripple compensating device able to be passively or dynamically adapted for both an amplitude and a phase of a torque ripple while minimizing an interference with an operation of an internal combustion engine, has surprisingly been discovered.

In one embodiment, the present invention is directed to a torque ripple compensating device for an internal combustion engine. The torque ripple compensating device comprises a first member, a second member, and a third member. The first member is in driving engagement with an output of the internal combustion engine. The second member is in driving engagement with the first member. The third member is in driving engagement with the second member. An angular deviation between the first member and the third member causes a cyclical acceleration of the third member. The cyclical acceleration of the third member applies a torque to the output of the internal combustion engine through the first member.

In another embodiment, the present invention is directed to a torque ripple compensating device for an internal combustion engine. The torque ripple compensating device comprises a first member, a second member, a flywheel, a hollow member, and an adjustment device. The first member is in driving engagement with an output of the internal combustion engine. The second member is in driving engagement with the first member. The flywheel is in driving engagement with the second member. The hollow member is rotatably disposed about the flywheel. The adjustment device is coupled to the hollow member. An angular deviation between the first member and the flywheel is configurable using the adjustment device. The angular deviation between the first member and the flywheel causes a cyclical acceleration of the flywheel. The cyclical acceleration of the flywheel applies a torque to the output of the internal combustion engine through the first member.

In yet another embodiment, the present invention is directed to a torque ripple compensating device for an internal combustion engine. The torque ripple compensating device comprises a first member, a second member, a flywheel, a hollow member, and an adjustment device. The first member is in driving engagement with an output of the internal combustion engine. The first member is oriented parallel to the output of the internal combustion engine and in driving engagement with the output of the internal combustion engine through a plurality of gears. The plurality of gears adjusts a drive ratio between the first member and the output of the internal combustion engine. The second member is in driving engagement with the first member. The flywheel is in driving engagement with the second member. The hollow member is rotatably disposed about the flywheel. The adjustment device is coupled to the hollow member. An angular deviation between the first member and the flywheel is configurable using the adjustment device. The angular deviation between the first member and the flywheel causes a cyclical acceleration of the flywheel. The cyclical acceleration of the flywheel applies a torque to the output of the internal combustion engine through the first member.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
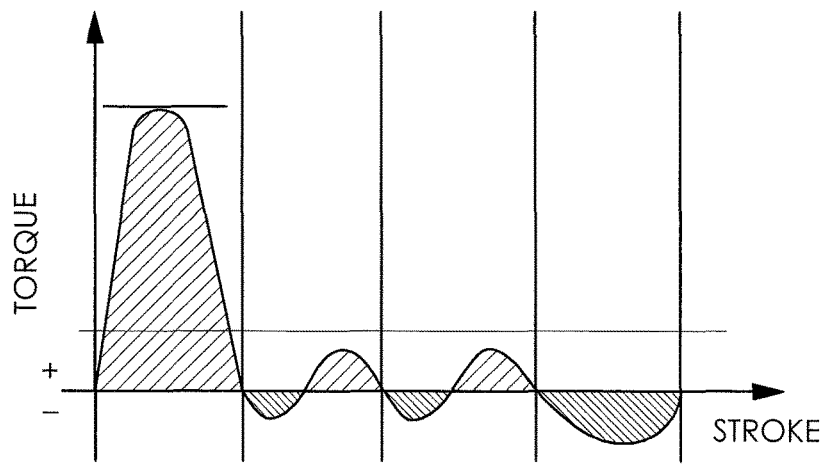
FIG. 1 is a graph illustrating a torque output of an engine during a four stroke cycle of an engine.
Figure 2:
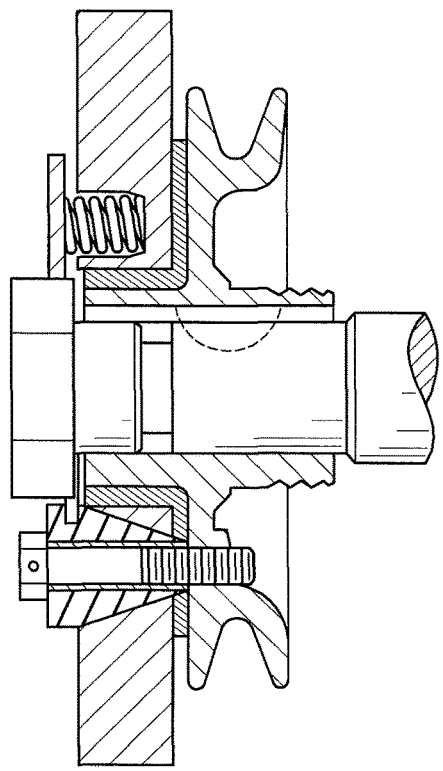
FIG. 2 is a sectional view of a flywheel based damping system known in the prior art.
Figure 3:
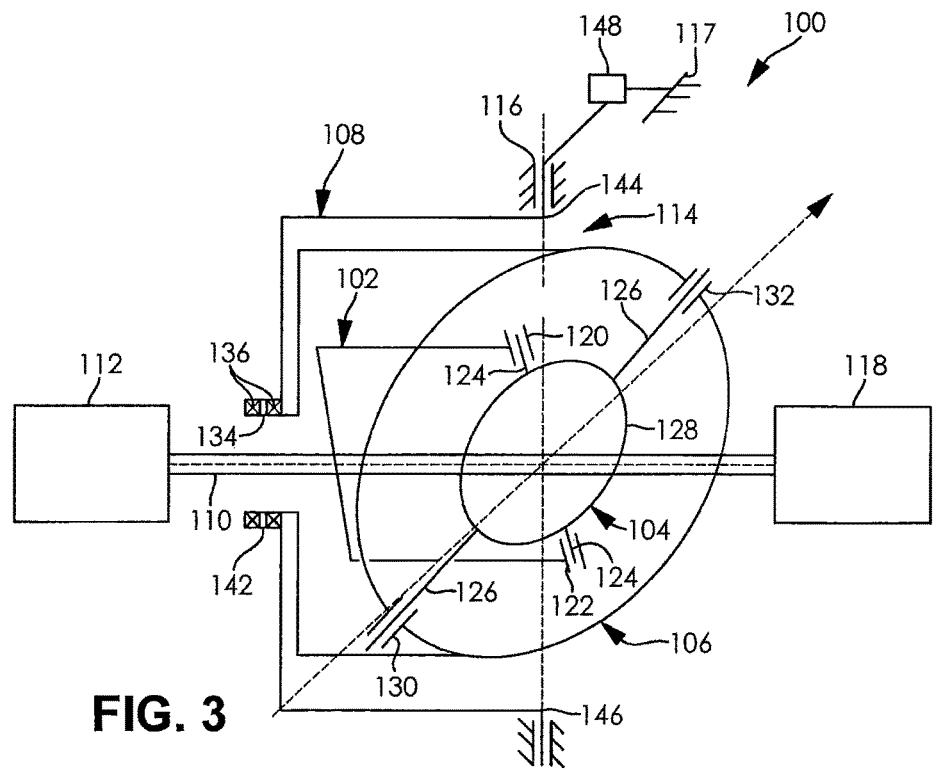
FIG. 3 is a schematic illustration of a torque ripple compensating device according to a first embodiment of the present invention.

FIG. 3 illustrates a torque ripple compensating device 100. The torque ripple compensating device 100 comprises a driving yoke 102, a cross-shaft 104, a flywheel 106, and a casing member 108. The torque ripple compensating device 100 is in driving engagement with a main shaft 110 of an internal combustion engine 112. The driving yoke 102 is in driving engagement with the main shaft 110 and the cross-shaft 104. The flywheel 106 is rotatably disposed within the casing member 108 and is in driving engagement with the cross-shaft 104. The driving yoke 102, the cross-shaft 104, and the flywheel 106 form a Cardan joint assembly 114. The casing member 108 is pivotally coupled to a first grounding member 116.

The internal combustion engine 112 applies power to the main shaft 110 through a crankshaft (not shown). The internal combustion engine 112, for example, a four cycle internal combustion engine; however, it is understood that the internal combustion engine 112 may be another type of internal combustion engine that generates a torque ripple. It is understood that the internal combustion engine 112 may be a hybrid power source including both an internal combustion engine and an electric motor.

The main shaft 110 is in driving engagement with the internal combustion engine 112 and a transmission 118. The main shaft 110 may form a portion of one of the internal combustion engine 112 and the transmission 118, or the main shaft 110 may be formed separate therefrom. The main shaft 110 is in driving engagement with the internal combustion engine 112 and the transmission 118 through splined connections formed on each end thereof; alternately, it is understood that the main shaft 110 may be in driving engagement with the internal combustion engine 112 and the transmission 118 in any other conventional manner.

The Cardan joint assembly 114 comprises the driving yoke 102, the cross-shaft 104, and the flywheel 106. The Cardan joint assembly 114 facilitates driving engagement between the main shaft 110 and the flywheel 106, allowing an axis of rotation of the flywheel 106 to be adjusted. In the Cardan joint assembly 114, a relation between the driving yoke 102 and the flywheel 106 may be described using the following equation:

$$\tan(\beta_1) = \cos(\theta)\tan(\beta)$$

In the above equation, $\theta$ is the angle between the driving yoke 102 and the flywheel 106, $\beta$ is the angle of rotation of the driving yoke 102 and $\beta_1$ is the angle of rotation of the flywheel 106. Furthermore, as the angles of rotation are different for the driving yoke 102 and the flywheel 106, the rotation speeds and accelerations will also be slightly different. The relation between the two rotational speeds is the following:

$$\omega_1 = \frac{\omega \cos(\theta)}{1 - \sin^2(\beta)\sin^2(\theta)}$$

In the above equation, $\omega$ is the rotational speed of the driving yoke 102 and $\omega_1$ is the rotational speed of the flywheel 106. A speed difference and an acceleration of the flywheel 106 may be described using a second order phenomenon (sinusoidal with a period of 180°).

The driving yoke 102 is a rigid member in driving engagement with the main shaft 110 and the cross-shaft 104. As shown in FIG. 3, the driving yoke 102 is a substantially U-shaped member, but it is understood that the driving yoke 102 may have other shapes. The driving yoke 102 defines a first pivot point 120 and a second pivot point 122. The first pivot point 120 and the second pivot point 122 are cylindrical recesses formed in the driving yoke 102. The first pivot point 120 and the second pivot point 122 are each oriented along a first axis A1. The first pivot point 120 and the second pivot point 122 are in rotatable driving engagement with the cross-shaft 104.

The cross-shaft 104 is a rigid member disposed about the main shaft 110 in driving engagement with the driving yoke 102 and the flywheel 106. The cross-shaft 104 has a perforation therethrough, which the main shaft 110 is disposed through. The cross-shaft 104 comprises a pair of primary trunnions 124, a pair of secondary trunnions 126, and a hub portion 128. The cross-shaft 104 is unitarily formed, however, it is understood that that cross-shaft 104 may comprise a plurality of portions coupled together in any conventional manner. The pair of primary trunnions 124 is opposingly disposed about the hub portion 128. The pair of primary trunnions 124 is disposed in the first pivot point 120 and the second pivot point 122, facilitating rotatable driving engagement between the cross-shaft 104 and the driving yoke 102. While not shown in FIG. 3, it is understood that a bearing (not shown) may be disposed between each of the trunnions 124 and the first pivot point 120 and the second pivot point 122. The pair of secondary trunnions 126 is opposingly disposed about the hub portion 128 and is oriented transverse to the pair of primary trunnions 124. An axis of the pair of secondary trunnions 126 is also coplanar with an axis of the pair of primary trunnions 124. The pair of secondary trunnions 126 facilitates rotatable driving engagement between the cross-shaft 104 and the flywheel 106.

The flywheel 106 is a hollow rigid member rotatably disposed within the casing member 108 and in driving engagement with the cross-shaft 104. The flywheel 106 is also disposed about the main shaft 110 and acts as a driven yoke of the Cardan joint assembly 114. As shown in FIG. 3, the flywheel 106 is a substantially hollow cylinder shaped member, but it is understood that the flywheel 106 may have other shapes suitable for rotation. The flywheel 106 defines a third pivot point 130, a fourth pivot point 132, and a journal portion 134. Because the flywheel 106 forms a portion of the Cardan joint assembly 114, an axis of rotation of the flywheel 106 may be adjusted.

The third pivot point 130 and the fourth pivot point 132 are cylindrical recesses formed in the flywheel 106. The third pivot point 130 and the fourth pivot point 132 are each oriented along a second axis A2. The pair of secondary trunnions 126 are disposed in the third pivot point 130 and the fourth pivot point 132, facilitating rotatable driving engagement between the cross-shaft 104 and the flywheel 106. While not shown in FIG. 3, it is understood that a bearing (not shown) may be disposed between each of the trunnions 126 and the third pivot point 130 and the fourth pivot point 132.

The journal portion 134 is an axially extending, annular portion of the flywheel 106 onto which at least one flywheel bearing 136 is disposed on; however, it is understood that the journal portion 134 may have other shapes. As shown in FIG. 3, the journal portion 134 is formed on a reduced diameter portion of the flywheel 106 and the journal portion 134 has two flywheel bearings 136 disposed thereon.

The flywheel bearings 136 are bearings disposed between and engaged with the journal portion 134 of the flywheel 106 and a portion of the casing member 108. The flywheel bearings 136 are ball bearings; however, it is understood that other types of bearings may be used. The flywheel bearings 136 comprise at least an inner race portion (not shown) and an outer race portion (not shown). The inner race portion is disposed on and engaged with the journal portion 134 of the flywheel 106. The outer race portion is disposed within and engaged with a journal portion 142 of the casing member 108.

The casing member 108 is a hollow rigid member rotatably disposed about the flywheel 106. The casing member 108 is also disposed about the main shaft 110. As shown in FIG. 3, the casing member 108 is a substantially hollow cylinder shaped member into which at least a portion of the main shaft 110, the driving yoke 102, and the flywheel 106 are disposed. The casing member 108 may also have other shapes. The casing member 108 defines the journal portion 142, a fifth pivot point 144, and a sixth pivot point 146. The casing member 108 is rotatable about a third axis A3, which is oriented transversely to an axis defined by the main shaft 110. The casing member 108 is in engagement with a second grounding member 117 through an adjustment device 148.

The journal portion 142 is an axially extending, annular portion of the casing member 108 into which the at least one flywheel bearing 136 is disposed; however, it is understood that the journal portion 142 may have other shapes. As shown in FIG. 3, the journal portion 134 is formed on a reduced diameter portion of the casing member 108 and the journal portion 142 has two flywheel bearings 136 disposed therein.

The fifth pivot point 144 and the sixth pivot point 146 are cylindrical protuberances extending from the casing member 108 along the third axis A3. The fifth pivot point 144 and the sixth pivot point 146 opposingly formed on the casing member 108 and are rotatably disposed within the first grounding member 116. While not shown in FIG. 3, it is understood that a bearing (not shown) may be disposed between each of the fifth pivot point 144 and the sixth pivot point 146 and the first grounding member 116 to facilitate rotation therebetween.

The first grounding member 116 is a rigid body into which at least a portion of the main shaft 110, the driving yoke 102, the flywheel 106, and the casing member 108 are disposed in. Typically, the first grounding member 116 is substantially fixed with respect to the internal combustion engine 112. As a non-limiting example, the first grounding member 116 is a housing removably coupled to the internal combustion engine 112 and the transmission 118; however, it is understood that the first grounding member 116 may be another rigid body coupled to a portion of a vehicle (not shown) incorporating the torque ripple compensating device 100. As mentioned hereinabove, the fifth pivot point 144 and the sixth pivot point 146 are rotatably disposed within the first grounding member 116. Further, it is understood that the first grounding member 116 may include the second grounding member 117 as a portion thereof. The adjustment device 148 is coupled to the second grounding member 117.

The adjustment device 148 is coupled to the casing member 108 and the second grounding member 117. The adjustment device 148 may be rotatably coupled to the casing member 108 through a casing member pivot point (not shown). The adjustment device 148 facilitates rotation of the casing member 108, and thus the flywheel 106, about the axis A3, resulting in an adjustment of a phase and an angle of the Cardan joint assembly 114. As non-limiting examples, the adjustment device 148 may be at least one biasing member (not shown) or an actuator (not shown) in communication with a controller (not shown). When the adjustment device 148 is at least one biasing member, it is understood that a rate of the at least one biasing member may be configured to adjust a position of the casing member 108 in response to a rotational speed and a load applied to the main shaft 110. When the adjustment device 148 is an actuator (not shown) in communication with a controller (not shown), it is understood that a position of the casing member 108 may be adjusted by the controller using the actuator in response to a rotational speed and a load applied to the main shaft 110.

Figure 4:
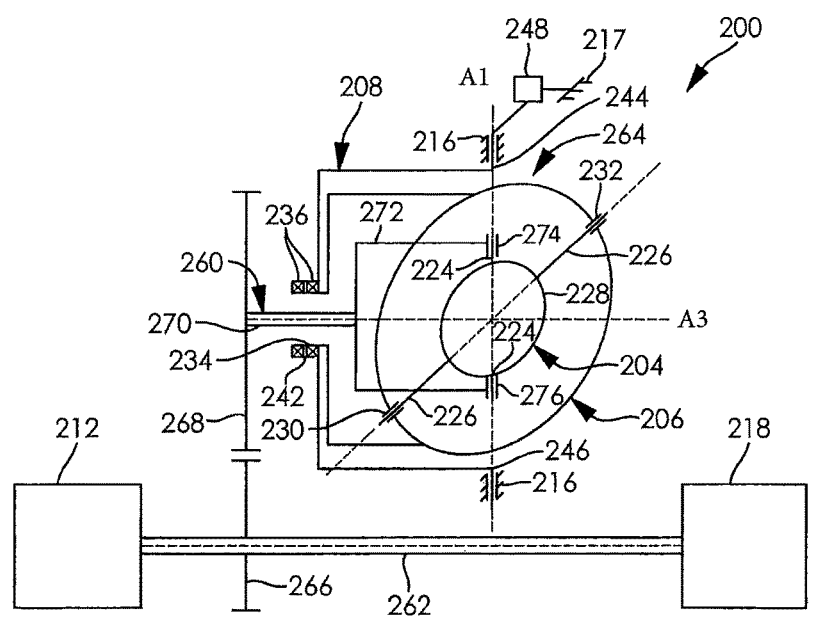
FIG. 4 is a schematic illustration of a torque ripple compensating device according to a second embodiment of the present invention.

FIG. 4 illustrates a torque ripple compensating device 200. The torque ripple compensating device 200 is a variation of the torque ripple compensating device 100, and has similar features thereto. The variation of the invention shown in FIG. 4 includes similar components to the torque ripple compensating device 100 illustrated in FIG. 3. Similar features of the variation shown in FIG. 4 are numbered similarly in series, with the exception of the features described below.

The torque ripple compensating device 200 comprises a gear driven yoke 260, a cross-shaft 204, a flywheel 206, and a casing member 208. The torque ripple compensating device 200 is in driving engagement with a geared main shaft 262 of an internal combustion engine 212. The gear driven yoke 260 is in driving engagement with the geared main shaft 262 and the cross-shaft 204. The flywheel 206 is rotatably disposed within the casing member 208 and is in driving engagement with the cross-shaft 204. The gear driven yoke 260, the cross-shaft 204, and the flywheel 206 form a Cardan joint assembly 264. The casing member 208 is pivotally coupled to a first grounding member 216.

The geared main shaft 262 is in driving engagement with the internal combustion engine 212 and a transmission 218. The geared main shaft 262 may form a portion of one of the internal combustion engine 212 and the transmission 218, or the geared main shaft 262 may be formed separate therefrom. The geared main shaft 262 is in driving engagement with the internal combustion engine 212 and the transmission 218 through splined connections formed on each end thereof; alternately, it is understood that the geared main shaft 262 may be in driving engagement with the internal combustion engine 212 and the transmission 218 in any other conventional manner. The geared main shaft 262 includes a geared portion 266 radially extending therefrom.

The geared portion 266 is in driving engagement with the geared main shaft 262 through a splined connection; alternately, it is understood that the geared portion 266 may be in driving engagement with the geared main shaft 262 in any other conventional manner. The geared portion 266 is a spur gear in driving engagement with the gear driven yoke 260; however, it is understood that the geared portion 266 may be in driving engagement with the gear driven yoke 260 in another manner, such as through a magnetic gearing arrangement.

The Cardan joint assembly 264 comprises the gear driven yoke 260, the cross-shaft 204, and the flywheel 206. The Cardan joint assembly 264 facilitates driving engagement between the geared main shaft 262 and the flywheel 206, allowing an axis of rotation of the flywheel 206 to be adjusted.

The gear driven yoke 260 is a rigid member in driving engagement with the geared portion 266 of the geared main shaft 262 and the cross-shaft 204. As shown in FIG. 4, the gear driven yoke 260 comprises a geared portion 268, a yoke shaft 270, and a U-shaped portion 272, but it is understood that the gear driven yoke 260 may have other shapes.

The geared portion 268 is in driving engagement with the yoke shaft 270 through a splined connection; alternately, it is understood that the geared portion 268 may be in driving engagement with the yoke shaft 270 in any other conventional manner. The geared portion 268 is a spur gear in driving engagement with the geared portion 266 of the geared main shaft 262; however, it is understood that the geared portion 268 may be in driving engagement with the geared portion 266 of the geared main shaft 262 in another manner, such as through a magnetic gearing arrangement.

The yoke shaft 270 is a rigid member in driving engagement with geared portion 268 and the U-shaped portion 272 through splined connections formed on each end thereof; alternately, it is understood that the yoke shaft 270 may be in driving engagement with the geared portion 268 and the U-shaped portion 272 in any other conventional manner. The yoke shaft 270 is rotatably supported adjacent the geared main shaft 262 using a plurality of bearings (not shown).

The U-shaped portion 272 defines a first pivot point 274 and a second pivot point 276. The first pivot point 274 and the second pivot point 276 are cylindrical recesses formed in the U-shaped portion 272. The first pivot point 274 and the second pivot point 276 are each oriented along a first axis A1. The first pivot point 274 and the second pivot point 276 are in rotatable driving engagement with the cross-shaft 204.

The geared portions 266, 268 of the torque ripple compensating device 200 may provide a gear ratio between the gear drive yoke 260 and the geared main shaft 262. Through the use of the gear ratio, an order of the torque oscillations created by the torque ripple compensating device 200 can be chosen to correct for any order needed. As a non-limiting example, a 6 cylinder engine would need a torque ripple compensating device 200 having a gear ratio corrected for the third order. Through the use of a specific gear ratio, it is possible to have the torque ripple compensating device 200 create a third order compensation.

The torque ripple compensating device 200 could be used to dampen many different orders, by incorporating at least one gear ratio into the torque ripple compensating device 200. The torque ripple compensating device 200 may be used with a unity ratio for practical reasons to dampen a second order oscillation.

In use, the torque ripple compensating device 100, 200 is drivingly engaged with the main shaft 110 or the geared main shaft 262. The torque ripple compensating device 100, 200 is a parallel, torque additive device for the internal combustion engine 112, 212. The non-homokinetic characteristic of the Cardan joint assembly 114, 264 is used to apply torque to the main shaft 110 or the geared main shaft 262 and correct a torque ripple generated by the internal combustion engine 112, 212. By rotating the casing member 108, 208 about the axis A3 using the adjustment device 148, 248, an angle is introduced between the flywheel 106, 206 and the driving yoke 102 or the gear driven yoke 260. As described hereinabove, an angle in the Cardan joint assembly 114, 264 introduces a speed deviation and a non-zero acceleration of the flywheel 106, 206. As a result of the speed deviation and the non-zero acceleration, rotational characteristics (such as speed and second order acceleration) of the flywheel 106, 206 are adjusted from those of the main shaft 110 or the geared main shaft 262. An inertia of the flywheel 106, 206 results in the torque ripple compensating device 100, 200 applying a second order torque ripple to the main shaft 110 or the geared main shaft 262 to dampen the torque ripple from the internal combustion engine 112, 212. It is also understood that when the geared portions 266, 268 of the torque ripple compensating device 200 provide a gear ratio between the gear drive yoke 260 and the geared main shaft 262, the geared portions 266, 268 may be configured to provide a torque of any order.

The torque ripple compensating device 100, 200 may be operated in a neutral mode and in an active cancellation mode. A mode of operation of the torque ripple compensating device 100, 200 is determined by an angle of rotation of the casing member 108, 208 and the flywheel 106, 206 with respect to the main shaft 110 or the geared main shaft 262.

In the neutral mode, the angle of the Cardan joint assembly 114, 264 is substantially equal to zero. Accordingly, the flywheel 106, 206 is rotated at substantially the same speed as the main shaft 110 or the geared main shaft 262. In the neutral mode, the flywheel 106, 206 functions as a conventional flywheel. To place the torque ripple compensating device 100, 200 in the neutral mode, the adjustment device 148, 248 positions the casing member 108, 208 so that the casing member 108, 208 rotates about an axis substantially coincident or substantially parallel to an axis of the main shaft 110 or the geared main shaft 262. As a result, the flywheel 106, 206, positioned by the casing member 108, 208 through the flywheel bearings 136, 236 rotates about an axis substantially coincident or substantially parallel to an axis of the main shaft 110 or the geared main shaft 262.

In the active cancellation mode, the angle of the Cardan joint assembly 114, 264 is substantially not equal to zero. Accordingly, the flywheel 106, 206 is rotated at a different speed from the main shaft 110 or the geared main shaft 262. In the active cancellation mode, the flywheel 106, 206 is subjected to second order accelerations. To place the torque ripple compensating device 100, 200 in the active cancellation mode, the adjustment device 148, 248 positions the casing member 108, 208 so that the casing member 108, 208 rotates about an axis oblique to an axis of the main shaft 110 or the geared main shaft 262. As a result, the flywheel 106, 206, positioned by the casing member 108, 208 through the flywheel bearings 136, 236 rotates about an axis oblique to an axis of the main shaft 110 or the geared main shaft 262.

As described hereinabove, an angle in the Cardan joint assembly 114, 264 introduces a speed deviation and a non-zero acceleration. Accordingly, a speed of the flywheel 106, 206 is not substantially equal to a speed of the main shaft 110 or the geared main shaft 262, and the flywheel 106, 206 undergoes some second order accelerations. As shown in the following formula, an inertia of the flywheel 106, 206 undergoing a speed variation, or acceleration, creates a torque.

$$T = J\frac{d\omega}{dt}$$

In the above equations, T is a torque generated by the flywheel 106, 206 in the active cancellation mode, ω is a rotational speed of the flywheel 106, 206, and J is an inertia of the flywheel 106, 206. It is understood that the inertia J may also include other components of the Cardan joint assembly 114, 264 subjected to the second order oscillations.

The amount of torque generated by the flywheel 106, 206 may be used to dampen a torque ripple of the internal combustion engine 112, 212. As a non-limiting example, a four-stroke four-cylinder internal combustion engine will see a greatest torque ripple peak four times every two rotation cycles of a crankshaft of the engine, thus requiring a second order torque peak to dampen the torque ripple.

It is also understood that the torque ripple compensating device 100, 200 is configured to adjust a phase of a torque generated, to ensure that the torque created by the flywheel 106, 206 is applied to decrease a torque ripple of the internal combustion engine 112, 212. The phase of a torque generated may be set in a dynamic manner. The phase of the torque correction is determined by an orientation of the axis A1 and the axis A2 with respect to an angle of the crankshaft of the internal combustion engine 112, 212. As a non-limiting example, an inclined orientation of the axes A1, A2 compared to the crankshaft of the internal combustion engine 112, 212 results in some dephasing. The inclination can be initially set through a design of the torque ripple compensating device 100, 200, but it is also understood that the torque ripple compensating device 100, 200 may be configured to allow the inclination to be dynamically adjusted during the operation of the torque ripple compensating device 100, 200.

An amplitude of the torque generated by the torque ripple compensating device 100, 200 is determined by an inertia of the flywheel 106, 206 and a joint angle of the Cardan joint assembly 114, 264. As the torque ripples of the internal combustion engine 112, 212 may vary depending on a rotational speed of the internal combustions engine 112, 212, a load on the internal combustion engine 112, 212, and other parameters, control of the amplitude of the torque generated by the torque ripple compensating device 100, 200 can be very beneficial. Control of the amplitude of the torque generated by the torque ripple compensating device 100, 200 can be performed in an active manner or a passive manner.

When the amplitude of the torque generated by the torque ripple compensating device 100, 200 is performed in the passive manner, the adjustment device 148, 248 may comprise at least one biasing member which controls a deviation of the axis of the flywheel 106, 206 from the axis of the main shaft 110 or the geared main shaft 262. At lower operational speeds, forces acting on the adjustment device 148, 248 comprising at least one biasing member are generally reduced, and therefore the adjustment device 148, 248 can be configured to provide a larger amount of deviation between the axis of the flywheel 106, 206 from the axis of the main shaft 110 or the geared main shaft 262. However, at higher operational speeds, the forces on the flywheel 106, 206 may be greater than a force applied by the adjustment device 148, 248 comprising at least one biasing member, resulting in a reduced amount of deviation between the axis of the flywheel 106, 206 from the axis of the main shaft 110 or the geared main shaft 262. In such a situation, a dampening effect provided by the torque ripple compensating device 100, 200 would be reduced. Such a behavior of the torque ripple compensating device 100, 200 would be beneficial as an amount of damping needed at higher operational speeds is typically smaller than at lower operational speeds. It is also understood that the adjustment device 148, 248 may comprise a compound biasing member or another type of device to generate a nonlinear response based on the operation speed.

When the amplitude of the torque generated by the torque ripple compensating device 100, 200 is performed in the active manner, the adjustment device 148, 248 may comprise an actuator which controls a deviation of the axis of the flywheel 106, 206 from the axis of the main shaft 110 or the geared main shaft 262. The torque ripple compensating device 100, 200 comprising an actuator could be controlled in real time to cancel the torque ripples of the internal combustion engine 112, 212.

Still yet another solution to adjust the amplitude of the torque generated by the torque ripple compensating device 100, 200 is to combine the active manner and the passive manner, through the use of the adjustment device 148, 248 comprising both a biasing member and an actuator. By combining the active manner and the passive manner, each type of control can be performed separately. As a non-limiting example, the passive manner may be employed for certain speeds and the active manner may be employed for other speeds. Further, a combination of the active manner and the passive manner can be performed simultaneously, using both a biasing member and an actuator of the adjustment device 148, 248. As a non-limiting example, the torque ripple compensating device 100, 200 may be mainly controlled in a passive control using a biasing member, with additional corrections able to be performed using an actuator.

It is also understood that a control of the amplitude of the torque generated by the torque ripple compensating device 100, 200 may also be performed by varying an inertia of the flywheel 106, 206 using any known variable inertia flywheel technology.

As explained above, a phase angle of the torque ripple compensating device 100, 200 compared to a plane of a plurality of pistons of the internal combustion engine 112, 212 is a crucial parameter to dampen torque ripples generated by the internal combustion engine. 112, 212. However, a phase of the torque ripple is not constant and varies with a rotational speed and a load applied to the internal combustion engine 112, 212. Accordingly, a phase angle of the torque ripple compensating device 100, 200 needs to be adapted depending on a rotational speed and a load applied to the internal combustion engine 112, 212. To do so, it is understood that it is within the scope of the invention to rotate the torque ripple compensating device 100, 200 around an axis of the main shaft 110 or the geared main shaft 262 to adapt a phase of the compensation generated by the torque ripple compensating device 100, 200.

The torque ripple compensating device 100 is useful to dampen second order torque ripples by introducing a second order speed oscillation using the Cardan joint assembly 114. The torque ripple compensating device 100 can be easily applied for use with internal combustion engines having four cylinders, in which a greatest amount of torque ripple occurs at the second order. Further, the torque ripple compensating device 200 as described hereinabove allows the torque ripple compensating device 200 to be used in internal combustion engines having a number of cylinders other than four; however, it is understood that the torque ripple compensating device 200 may be used with a unity ratio (1:1) to dampen a second order oscillation which occurs with an engine having four cylinders.

Based on the forgoing, it can be appreciated that the torque ripple compensating device 100, 200 described and depicted herein has several advantages. The torque ripple compensating device 100, 200 provides torque ripple compensation that can be actively regulated in both amplitude and phase. Further, the torque ripples of the internal combustion engine 112, 212 are corrected using the torque ripple compensating device 100, 200 by adding torque in parallel. The torque ripple compensating device 100, 200 uses commonly available components which reduce a cost and increase a reliability of the torque ripple compensating device 100, 200. The torque ripple compensating device 100, 200 also permits flexibility in a size of the flywheel 106, 206, as the compensation provided by the torque ripple compensating device 100, 200 is a combination of a size of the flywheel 106, 206 and an angle provided by the Cardan joint assembly 114, 264. Further, the torque ripple compensating device 100, 200 is efficient and does not dissipate a large portion of energy passing through the main shaft 110 or the geared main shaft 262.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A torque ripple compensating device for an internal combustion engine, the torque ripple compensating device comprising:
    a first member in driving engagement with an output of the internal combustion engine;
    a second member in driving engagement with the first member; and
    a flywheel in driving engagement with the second member,
    wherein an angular deviation between the first member and the flywheel causes a cyclical acceleration of the flywheel, the cyclical acceleration of the flywheel applying a torque to the output of the internal combustion engine through the first member, and
    wherein the flywheel is rotatably disposed within a hollow member.

2. The torque ripple compensating device of claim 1, wherein the first member, the second member, and the flywheel form a Cardan joint assembly.

3. The torque ripple compensating device of claim 1, wherein the hollow member is pivotally coupled to a grounding member.

4. The torque ripple compensating device of claim 3, further comprising an adjustment device coupled to the hollow member and the grounding member.

5. The torque ripple compensating device of claim 1, wherein the angular deviation between the first member and the flywheel is configurable using an adjustment device.

6. The torque ripple compensating device of claim 5, wherein the adjustment device is a biasing member.

7. The torque ripple compensating device of claim 5, wherein the adjustment device is an actuator.

8. The torque ripple compensating device of claim 1, wherein the first member is oriented parallel to the output of the internal combustion engine.

9. A torque ripple compensating device for an internal combustion engine, the torque ripple compensating device comprising:
    a first member in driving engagement with an output of the internal combustion engine;
    a second member in driving engagement with the first member; and
    a third member in driving engagement with the second member,
    wherein an angular deviation between the first member and the third member causes a cyclical acceleration of the third member, the cyclical acceleration of the third member applying a torque to the output of the internal combustion engine through the first member, and
    wherein the first member is in driving engagement with the output of the internal combustion engine through a plurality of gears.

10. The torque ripple compensating device of claim 9, wherein the plurality of gears adjust a drive ratio between the first member and the output of the internal combustion engine.

11. A torque ripple compensating device for an internal combustion engine, the torque ripple compensating device comprising:
    a first member in driving engagement with an output of the internal combustion engine;

a second member in driving engagement with the first member;

a flywheel in driving engagement with the second member;

a hollow member rotatably disposed about the flywheel; and an adjustment device coupled to the hollow member, wherein an angular deviation between the first member and the flywheel is configurable using the adjustment device, the angular deviation between the first member and the flywheel causing a cyclical acceleration of the flywheel, the cyclical acceleration of the flywheel applying a torque to the output of the internal combustion engine through the first member.

12. The torque ripple compensating device of claim 11, wherein the first member, the second member, and the third member form a Cardan joint assembly.

13. The torque ripple compensating device of claim 11, wherein the hollow member is pivotally coupled to a grounding member.

14. A torque ripple compensating device for an internal combustion engine, the torque ripple compensating device comprising:

a first member in driving engagement with an output of the internal combustion engine, the first member oriented parallel to the output of the internal combustion engine and in driving engagement with the output of the internal combustion engine through a plurality of gears, the plurality of gears adjusting a drive ratio between the first member and the output of the internal combustion engine;

a second member in driving engagement with the first member;

a flywheel in driving engagement with the second member;

a hollow member rotatably disposed about the flywheel; and an adjustment device coupled to the hollow member, wherein an angular deviation between the first member and the flywheel is configurable using the adjustment device, the angular deviation between the first member and the flywheel causing a cyclical acceleration of the flywheel, the cyclical acceleration of the flywheel applying a torque to the output of the internal combustion engine through the first member.

15. The torque ripple compensating device of claim 14, wherein the first member, the second member, and the third member form a Cardan joint assembly.

16. The torque ripple compensating device of claim 14, wherein the hollow member is pivotally coupled to a grounding member.

\* \* \* \* \*